United States Patent
Böttle

[11] Patent Number: 5,175,777
[45] Date of Patent: Dec. 29, 1992

[54] OPTICAL SWITCHING MATRIX INCLUDING PLURAL WAVELENGTH CONVERTING DEVICES

[75] Inventor: Dietrich Böttle, Salach, Fed. Rep. of Germany

[73] Assignee: Alcatel N.V., Amsterdam, Netherlands

[21] Appl. No.: 714,280

[22] Filed: Jun. 12, 1991

[30] Foreign Application Priority Data

Jun. 15, 1990 [DE] Fed. Rep. of Germany ....... 4019225

[51] Int. Cl.[5] ............................ G02B 6/28; H04J 3/00
[52] U.S. Cl. ......................................... 385/17; 385/16; 385/24; 385/44; 359/115; 359/124; 359/128; 359/139
[58] Field of Search ....................... 385/15, 16, 18, 17, 385/36, 44, 24; 359/115, 116, 124, 128, 139, 123

[56] References Cited

U.S. PATENT DOCUMENTS

| | | | |
|---|---|---|---|
| 4,382,266 | 5/1983 | Panzer | 359/128 |
| 4,845,703 | 7/1989 | Suzuki | 359/128 |
| 4,883,334 | 11/1989 | Chiarulli et al. | 385/24 |
| 4,886,335 | 12/1989 | Yanagawa et al. | 385/24 |
| 5,074,634 | 12/1991 | Takahashi | 385/24 |
| 5,093,875 | 3/1992 | Ogura et al. | 385/17 |
| 5,111,519 | 5/1992 | Mathis | 385/24 |
| 5,113,244 | 5/1992 | Curran | 385/24 |
| 5,113,459 | 5/1992 | Grasso et al. | 385/24 |

FOREIGN PATENT DOCUMENTS 2-93436  4/1990  Japan ............................. 359/117 X

OTHER PUBLICATIONS

Sakaguchi et al., "Optical Switching Device Technologies", *IEEE Communications Magazine* vol. 25, No. 5, May 1987, pp. 27-32.

Primary Examiner—Brian Healy
Attorney, Agent, or Firm—Brunell & May

[57] ABSTRACT

Switches (multiplexers, demultiplexers, data switches) are provided for optical signal transmission, by which two or more data streams are combined or separated or by which combined data streams are switched. Instead of buffering as in time-division multiplexing, wavelength conversions are performed. By space-division and wavelength-division multiplexing, storage problems can be largely avoided.

4 Claims, 2 Drawing Sheets

OPTICAL SWITCHING MATRIX INCLUDING PLURAL WAVELENGTH CONVERTING DEVICES

TECHNICAL FIELD

The present invention relates to an optical switch.

CLAIM FOR PRIORITY

This application is based on and claims priority from German Patent Application No. 40 19 225.3 dated Jun. 15, 1990. To the extent such prior application may contain any additional information that might be of any assistance in the use and understanding of the invention claimed herein, it is hereby incorporated by reference.

BACKGROUND ART

Known are electric switches (multiplexers, demultiplexers, data switches) by which two or more data streams are combined or separated or by which combined data streams are switched.

In conventional, electric transmission systems, digital data is commonly transmitted using time-division multiplexing, i.e., by interleaving data of different connections in time.

Here, both time-division-multiplex channels, i.e., associated time slots with a fixed spacing, and calls using cells inserted into a data stream at irregular intervals must be mentioned. The former is the STM technique (STM = Synchronous Transfer Mode), which has long been known but has only recently been termed so, and the latter is the ATM technique (ATM = Asynchronous Transfer Mode).

In conventional, electric transmission systems, the combination, particularly the switching, of such time-division multiplex data streams is effected using space-division and time-division multiplexing.

For optical signal transmission, comparable switches are to be provided. For space-division switching, i.e., the switching of an optical signal from one optical signal path to another, there are already sufficient practicable solutions. Time-division switching, which involves buffering, has been solved in principle, but for practical applications, particularly for the switching of optical ATM signals, the solutions are unsuitable.

DISCLOSURE OF INVENTION

The idea underlying the invention is to replace or at least supplement the time-division multiplex in the case of optical signals by a wavelength-division multiplex. By space- and wavelength-division multiplexing, storage problems can be largely avoided. Instead of buffering as in time-division multiplex systems, wavelength conversions are performed.

The invention will now be described using data switches as an example, but it is equally applicable to multiplexers and demultiplexers. Each data switch can be regarded both as a combination of two or more multiplexers and as a combination of two or more demultiplexers. Spatially distributed switching systems, such as ring systems, make use of this fact as individual signals are inserted into a data stream by multiplexers or extracted from such a data stream by demultiplexers. In the case of a wavelength division multiplex data stream, this can be done in basically the same way as in a time-division-multiplex data stream. In principle, use can be made of the same structures as those employed in space-division and time-division multiplexing.

BRIEF DESCRIPTION OF DRAWINGS

Two embodiments of the invention will now be explained with reference to the accompanying drawings, in which.

BEST MODE FOR CARRYING OUT THE INVENTION

Figure 1:
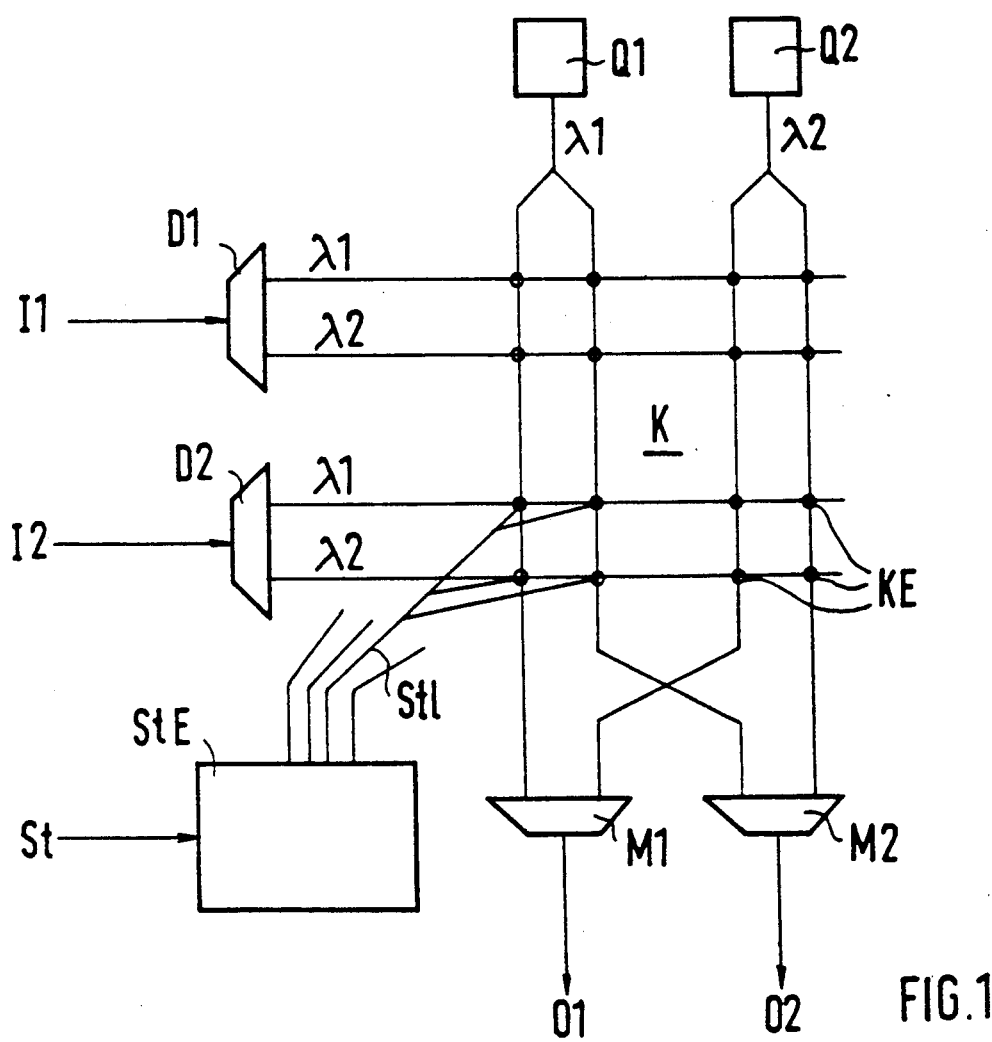
FIG. 1 shows a 2×2 data switch with a switching matrix.

The data switch shown in FIG. 1 has two inputs I1 and I2, two outputs 01 and 02, two wavelength-division demultiplexers D1 and D2, two wavelength-division multiplexers M1 and M2, two constant light sources Q1 and Q2, and a switching matrix K with switching elements KE.

The switch further includes a control unit StE with control leads St1 for controlling the switching elements KE and an external control lead St for receiving the necessary control signals.

At each input and output, two signals can be transmitted in a wavelength-division multiplex mode. Two operating wavelengths lambda 1 and lambda 2 are provided. In each of the demultiplexers D1 and D2 following the inputs I1 and I2, a separation according to the two wavelengths takes place. The four separate signals are applied to the row leads of the switching matrix K.

The two constant light sources Q1 and Q2 operate at the two wavelengths lambda 1 and lambda 2, respectively. Each constant light source feeds two row leads of the switching matrix K.

The row and column leads intersect at the switching elements KE. Each switching element KE is designed to pass the light from the associated constant light source unaltered in a nonactivated state and to modulate this light with the signal of the associated row lead n an activated state. The switching between the activated and nonactivated states is effected by the above-mentioned means for controlling the switching elements.

From each constant light source Q1 and Q2, a column lead runs to each wavelength-division multiplexer M1 and M2. The wavelength-division multiplexers M1 and M2 are connected ahead of the outputs 01 and 02, respectively, and each combine the signals intended for the respective output, which are modulated onto light of different operating wavelengths, into a common wavelength-division-multiplex signal.

Thus, a signal path which is switchable or not switchable for each signal component coming from the input by activation or nonactivation of a switching element KE runs from each input I1 and I2 to each output 01 and 02. By proper selection of the switching elements, the signal path can be switched with wavelength conversion (lambda 1/lambda 2, lambda 2/lambda 1) or without wavelength conversion (lambda 1/lambda 1, lambda 2/lambda 2). Thus, each signal component arriving at one of the inputs can be switched to each of the outputs with or without wavelength conversion, care normally having to be taken to ensure that for each operating wavelength, no more than one signal component is switched to each output, i.e., that per column lead, no more than one switching element is activated at a time.

It will be readily apparent to those skilled in the art that various modifications may be made to the switch described with the aid of FIG. 1 without departing from the scope of the invention. For example:

Each additional input requires an additional demultiplexer, one additional row lead per operating wavelength, and the associated additional switching elements.

Each additional output requires one additional column lead per operating wavelength, the associated additional switching elements, and one additional multiplexer.

Each additional operating wavelength requires one additional output and one additional row lead per demultiplexer, an additional constant light source, an additional column lead from the latter to each multiplexer, the associated additional switching elements, and one additional input per multiplexer.

If the optical switch has only one input, it is an optical demultiplexer. It can be used, for example, to extract a signal component for an individual subscriber from a multiplex signal circulating in a ring. In this case, wavelength converters will advantageously be provided only in the path to this individual subscriber so as to be able to extract any signal component, but to offer it to the subscriber always with the same wavelength.

Conversely, the optical switch may have only one output and operate as an optical multiplexer to couple a signal component from an individual subscriber into, e.g., a mutiplex signal circulating in a ring. In this case, a wavelength conversion only for the signal component coming from this subscriber may be sufficient, and the splitting of the transmitted signal, and hence the multiplexer at the input, can be dispensed with.

The control signals from which the signals for driving the switching elements are derived may also be received via the inputs I1 and I2, as is the case in conventional switches. For this, an additional wavelength may be used; this corresponds to a separate control channel in time-division multiplex. The control signals may also form part of the individual signal components, e.g., such that each message to be switched is preceded by control signals.

The switching-through of the switching elements may also be performed dynamically. Thus, in distribution services, for example, the switch can also perform the function of a service multiplexer, or simultaneous time-division-multiplex switching is possible.

In particular, it is intended to design the switch for the transfer of ATM signals. Each signal component consists of a sequence of ATM cells which each consist of a cell header followed by an information part ("payload"). The cell header contains information from which the remaining path to be taken by the cell can be derived. From this, as is customary in ATM, control information for dynamically controlling the switching elements can be derived. With the aid of this control information, a given signal path is then switched for the duration of one ATM cell and, if required, a conversion of the wavelength is initiated.

The fundamental idea of the invention can be applied to nearly all structures known from electric time-division multiplex systems. With the aid of FIG. 2, this will now be illustrated by the example of a structure which is totally different from that of FIG. 1.

Figure 2:
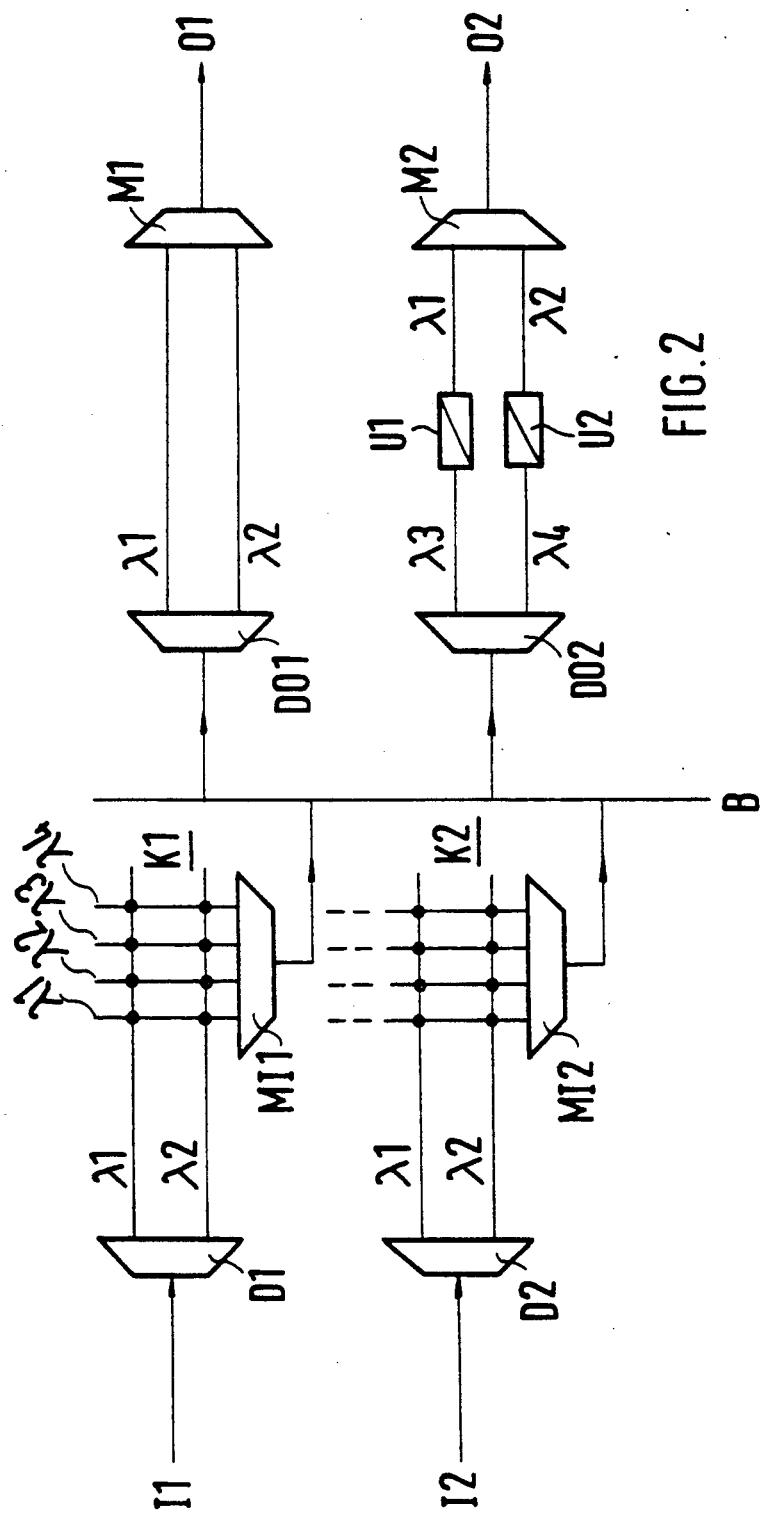
FIG. 2 shows a 2×2 data switch with a central data bus.

The switch of FIG. 2, like that of FIG. 1, has two inputs I1 and I2, two outputs O1 and O2, two wavelength-division demultiplexers D1 and D2, and two wavelength-division multiplexers M1 and M2.

Unlike in the example of FIG. 1, first a supermultiplex signal is formed. The signal coming from the input I1 is separated by the demultiplexer D1 into signal components having the operating wavelengths lambda 1 and lambda 2. The signal components are switched through a switching matrix K1 at one of four wavelengths lambda 1, . . . , lambda 4 according to their destination at the outputs. The outputs of the switching matrix K1 are followed by a wavelength-division multiplexer MI1.

Similarly, the demultiplexer D2 associated with the input I2 is followed by a switching matrix K2 which is followed by a wavelength-division multiplexer MI2.

The outputs of the multiplexers MI1 and MI2 are coupled to an optical bus B.

The multiplexer M1 ahead of the output O1 is preceded by a wavelength-division demultiplexer D01. The input of the latter is connected to the optical bus B. The wavelength-division demultiplexer D01 has only outputs for the wavelengths lambda 1 and lambda 2, which are recombined by the multiplexer M1.

Associated with the output O2 is a wavelength-division demultiplexer D02 which has outputs for the wavelengths lambda 3 and lambda 4. In wavelength converters U1 and U2, the wavelengths lambda 3 and lambda 4 are converted to the wavelengths lambda 1 and lambda 2, respectively, which are recombined by the multiplexer M2.

The devices for controlling the switching elements of the switching matrices K1 and K2 as well as the necessary constant light sources are not shown here.

For the realization of the individual functions, the person skilled in the art has sufficient possibilities. For example, reference is made to an article by M. Sakaguchi and K. Kaede, "Optical Switching Device Technologies", IEEE Communications Magazine, May 1987, Vol. 25, No 5.

Simple demultiplexers can be implemented with filters, and simple multiplexers with couplers. Preferred switching elements are optically controllable and electrically activatable elements. For the time being, however, the electric controllability of optical switches is simpler to implement; to this end, the input signal components would have to be converted to electric signals.

From the example of FIG. 2 it is also readily apparent that a switching matrix can be replaced by tunable wavelength converters or by connectable and disconnectable fixed-tuned wavelength converters combined with optical switches. In that case, the optical switches must not be designed as modulators in which the input signal is used only for control purposes, but rather the switches must be designed so that the optical input signal itself is switched through.

The embodiments given and the possible modifications indicated show that a switch according to the invention can be implemented in various ways.

I claim:

1. An optical data switch comprising
   at least two input terminals each capable of simultaneously receiving at least two input transmission frequencies,
   at least two output terminals each capable of outputting at least two output transmission frequencies.
   a switching matrix coupled between said input terminals and said output terminals and capable of providing at least two dynamically switchable signal paths from each of said input terminals to each of said output terminals, a plurality of wavelength-converting devices, each associated with a different point of said switching matrix, and means for dynamically switching each of said wavelength-converting devices into at least one of said dynamically switchable signal paths, whereby two channels of data input having the same input frequency but input at different input terminals may be dynamically switched and wavelength converted inside said switching matrix for output as different frequencies at the same output terminal, and two channels of data input having different input frequencies and input at the same input terminal may be dynamically switched and wavelength converted inside said switching matrix for output at the same frequency at different output terminals.

2. An optical data switch as claimed in claim 1, further comprising a wavelength-selective device between each wavelength-converting device and the input terminal of the switchable path into which the wavelength-converting device is switched.

3. An optical data switch as claimed in claim 1, further comprising a respective wavelength-selective device associated with each said input terminal for separating an input signal present at said each input terminal into two or more signal components which differ by their operating wavelengths, a respective said converting device for each of said individual signal components capable of converting a respective signal component to any other operating wavelength, and a respective combiner device associated with each said output terminal for combining the signal components switched to said each output terminal.

4. An optical data switch as claimed in claim 1, wherein both the signal path is switched and the wavelength-converting device is switched in for a common period equal to the duration of one ATM cell.

* * * * *